(12) United States Patent
Lam et al.

(10) Patent No.: US 11,797,471 B2
(45) Date of Patent: Oct. 24, 2023

(54) SYSTEM AND METHOD FOR CONTROLLING A COMPUTER TO RECEIVE EXTERNAL DATA FOR OUT-OF-BAND MANAGEMENT

(71) Applicant: FLYTECH TECHNOLOGY CO., LTD., Taipei (TW)

(72) Inventors: Tai-Seng Lam, Taipei (TW); Li-Chun Chou, Taipei (TW); Shui-Chin Tsai, Taipei (TW); Ting-You Liou, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/842,973

(22) Filed: Jun. 17, 2022

(65) Prior Publication Data

US 2023/0237004 A1  Jul. 27, 2023

(30) Foreign Application Priority Data

Jan. 22, 2022  (TW) .................................. 111102739

(51) Int. Cl.
*G06F 13/42* (2006.01)
*G06F 8/65* (2018.01)
(Continued)

(52) U.S. Cl.
CPC ............ *G06F 13/4291* (2013.01); *G06F 8/65* (2013.01); *G06F 13/1668* (2013.01); *G06F 13/382* (2013.01)

(58) Field of Classification Search
CPC ............. G06F 13/4291; G06F 13/1668; G06F 13/382; G06F 8/65
See application file for complete search history.

(56) References Cited

U.S. PATENT DOCUMENTS

| | | |
|---|---|---|
| 2013/0007430 A1 | 1/2013 | Fan |
| 2017/0109312 A1 | 4/2017 | Voor et al. |
| 2021/0182051 A1 | 6/2021 | Lin et al. |

FOREIGN PATENT DOCUMENTS

| | | | | |
|---|---|---|---|---|
| CN | 209170528 U | * | 7/2019 | |
| CN | 112894740 A | * | 6/2021 | ............... B25H 3/02 |

(Continued)

OTHER PUBLICATIONS

Translation of CN-209170528-U (Year: 2019).*

(Continued)

*Primary Examiner* — Henry Tsai
*Assistant Examiner* — John B Roche
(74) *Attorney, Agent, or Firm* — Hamre, Schumann, Mueller & Larson, P.C.

(57) ABSTRACT

A system includes a switch unit that is connected to a host connector of a computer, an embedded controller (EC) that connected to the switch unit, and a management device that includes a device connector and a microcontroller. The device connector is connected to the host connector. The microcontroller is connected to the device connector, and sends external data via the device connector to the EC. When the EC is supplied with electricity, the EC controls the switch unit to establish an electrical connection between the EC and the host connector so as to allow the EC to communicate with the microcontroller through the EC and the host connector to receive the external data from the microcontroller.

12 Claims, 3 Drawing Sheets

(51) Int. Cl.
*G06F 13/16* (2006.01)
*G06F 13/38* (2006.01)

(56) References Cited

FOREIGN PATENT DOCUMENTS

| CN | 113721734 A | * | 11/2021 |
| TW | 201042456 A | | 12/2010 |
| TW | 201243718 A | | 11/2012 |

OTHER PUBLICATIONS

Translation of CN-112894740-A (Year: 2021).*
Translation of CN-113721734-A (Year: 2021).*
Search Report issued to European counterpart application No. 22180054.3 by the EPO dated Nov. 28, 2022 (7 pages).
Search Report appended to an Office Action, which was issued to Taiwanese counterpart application No. 111102739 by the TIPO dated Nov. 16, 2022, with an English translation thereof (2 pages).

* cited by examiner

SYSTEM AND METHOD FOR CONTROLLING A COMPUTER TO RECEIVE EXTERNAL DATA FOR OUT-OF-BAND MANAGEMENT

CROSS-REFERENCE TO RELATED APPLICATION

This application claims priority of Taiwanese Invention Patent Application No. 111102739, filed on Jan. 22, 2022.

FIELD

The disclosure relates to a system and a method for controlling a computer to receive external data for out-of-band (COB) management.

BACKGROUND

For a computer (e.g., the Intel vPro® platform) that supports active management technology, an in-band management is adopted to manage the computer. For example, when an abnormal condition occurs in the computer, a remote server is utilized to communicate with the computer, perform fault diagnosis, and repair or restore functions of the computer.

However, the in-band management is unsuitable for a condition where the computer cannot boot normally, which may be caused by inappropriate settings of basic input/output system (BIOS) of the computer.

SUMMARY

Therefore, an object of the disclosure is to provide a system and a method for controlling a computer to receive external data for out-of-band (COB) management that can alleviate at least one of the drawbacks of the prior art.

According to one aspect of the disclosure, the computer includes a host connector.

The system includes a switch unit that is configured to be electrically connected to the host connector, an embedded controller (EC) that is electrically connected to the switch unit, and a management device that includes a device connector and a microcontroller.

The device connector is configured to be electrically connected to the host connector. The microcontroller is electrically connected to the device connector, and is configured to send external data via the device connector of the management device to the EC.

When the EC is supplied with electricity, the EC controls the switch unit to establish an electrical connection between the EC and the host connector so as to allow the EC to communicate with the microcontroller through the EC and the host connector to receive the external data from the microcontroller.

According to another aspect of the disclosure, the computer includes a host connector. The method is to be implemented by a system that includes an embedded controller (EC), a memory device and a management device. The management device includes a microcontroller. The method includes steps of:

the EC operating in a master mode to output a detection signal through a serial communication bus that uses a master-slave architecture, to detect whether a slave device that supports a predefined protocol is connected to the serial communication bus;

the microcontroller operating in a slave mode, and establishing communication with the EC and adjusting voltage levels respectively on a serial data (SDA) line and a serial clock (SCL) line of the serial communication bus in response to receipt of the detection signal in a manner that the voltage levels on the SDA line and the SCL line satisfy a predefined condition;

when it is determined that the voltage levels on the SDA line and the SCL line of the serial communication bus satisfy the predefined condition, the EC switching to the slave mode and enabling the microcontroller to switch to the master mode;

the microcontroller operating in the master mode to transmit external data via the serial communication bus to the EC;

after transmission of the external data is completed, the microcontroller notifying the EC of the completion of the transmission;

in response to receipt of the notification of the completion of the transmission, the EC switching to the master mode and adjusting the voltage levels on the SDA line and the SCL line of the serial communication bus in a manner that the voltage levels on the SDA line and the SCL line satisfy the predefined condition so as to enable the microcontroller to switch to the slave mode; and after receiving the external data, the EC storing the external data in the memory device and executing a related procedure based on the external data.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
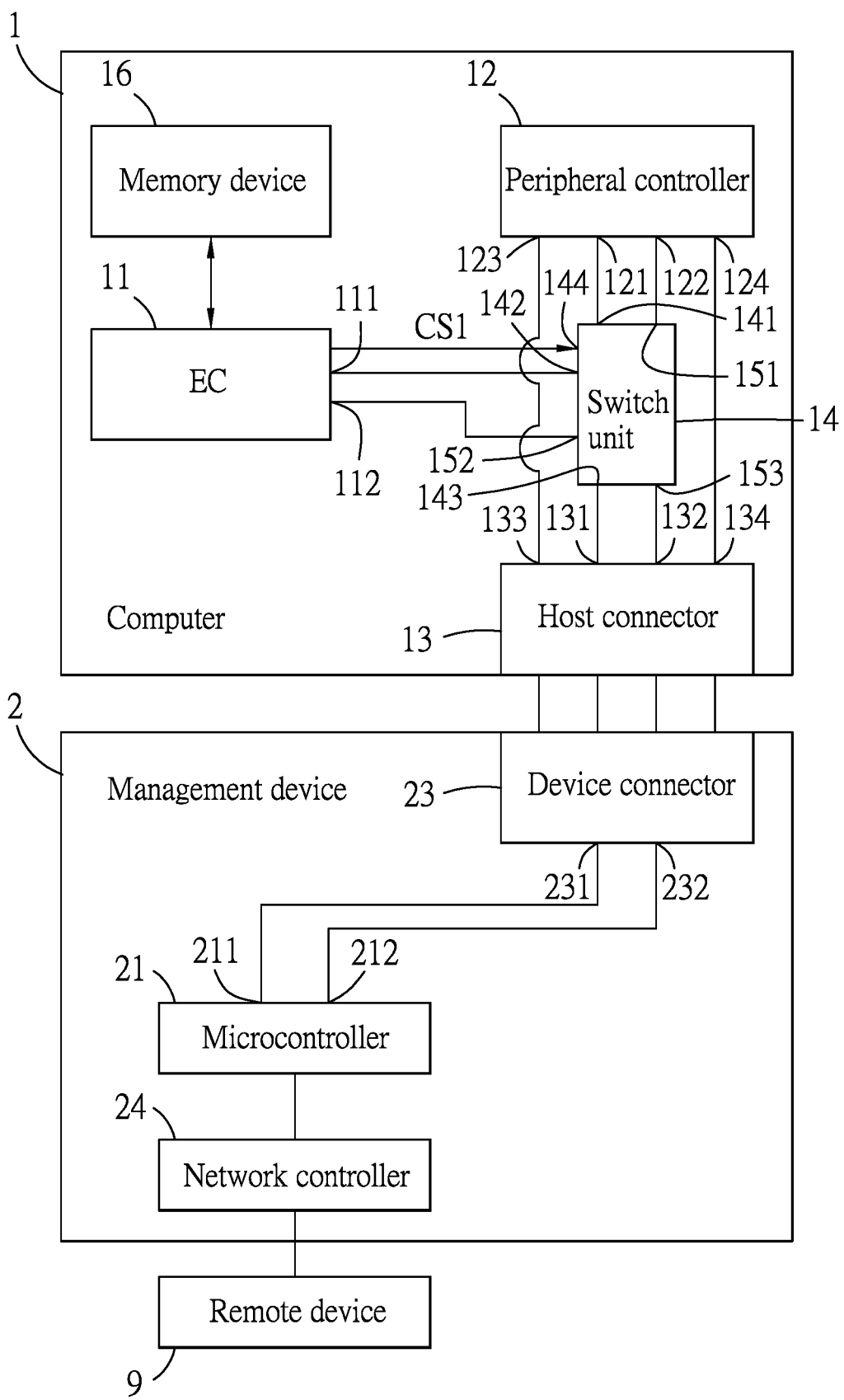
FIG. 1 is a block diagram illustrating an embodiment of a system for controlling a computer to receive external data for out-of-band (OOB) management according to the disclosure.

Referring to FIG. 1, an embodiment of a system for controlling a computer 1 to receive external data for out-of-band (OOB) management is illustrated. The computer 1 may be implemented by an industrial computer, a personal computer (PC), a computing server or a data server, but implementation of the computer 1 is not limited to the disclosure herein and may vary in other embodiments.

The computer 1 includes a peripheral controller 12, a host connector 13, a power supply (not shown), a platform controller hub (PCH, not shown), a processor (not shown) such as a central processing unit (CPU), a volatile memory (not shown) such as double data rate a synchronous dynamic random access memory (DDR SDRAM), and a non-volatile memory (not shown) such as flash memory that stores firmware (e.g., basic input/output system, BIOS) of the computer 1. The peripheral controller 12 and the host connector 13 support universal serial bus (USB) standards. The peripheral controller 12 may be implemented by any circuit configurable/programmable in a software manner and/or hardware manner to implement functionalities discussed in this disclosure.

The system includes an embedded controller (BC) 11, a switch unit 14, a memory device 16 and a management device 2.

The management device 2 is a specialized device for implementing COB management. The management device 2 includes a microcontroller 21, a device connector 23 and a network controller 24. The microcontroller 21 is electrically connected to the device connector 23 and the network controller 24. The device connector 23 is configured to be electrically connected to the host connector 13. The device connector 23 supports USB standards.

The network controller 24 is implemented to be a network interface controller that supports Ethernet standards, or a wireless transceiver that supports wireless communication standards, such as Bluetooth® technology standards, Wi-Fi technology standards and/or cellular network technology standards, but is not limited thereto. The network controller 24 is configured to allow the microcontroller 21 to communicate with a remote device 9 (e.g., a remote data server) for receiving the external data from the remote device 9. Further, the microcontroller 21 is configured to send the external data via the device connector 23 of the management device 2 to the EC 11.

In one embodiment, the management device 2 further includes an RJ45 connector (not shown) for allowing the management device 2 to establish a wired connection with an Ethernet hub, a modem, etc. for communicating with the remote device 9.

In one embodiment, the management device 2 further includes a storage device (not shown). The storage device may be implemented by a random access memory (RAM), a double data rate synchronous dynamic random access memory (DDR SDRAM), a read only memory (ROM), a programmable ROM (PROM), a flash memory, a hard disk drive (HDD), a solid state disk (SSD), an electrically-erasable programmable read-only memory (EEPROM) or any other volatile/non-volatile memory devices, but is not limited thereto. The storage device is configured to store the external data that is received from the remote device 9 and that is to be sent to the EC 11.

The switch unit 14 is configured to be electrically connected to the peripheral controller 12 and the host connector 13. The EC 11 is electrically connected to the switch unit 14 and the memory device 16. The EC 11 is configured to control the switch unit 14 to switch between a USB state allowing the peripheral controller 12 to communicate with an external USB device (e.g., a flash drive, not shown) via the host connector 13, and an OOB state allowing the EC 11 to communicate with the management device 2 via the host connector 13.

The EC 11 and the microcontroller 21 are configured to communicate with each other using a USB protocol under a master-slave architecture. In particular, the EC 11 and the microcontroller 21 are configured to communicate with each other over an inter-integrated circuit (I²C) bus, which includes a serial data (SDA) line and a serial clock (SCL) line. In some embodiments, the EC 11 and the microcontroller 21 may communicate with each other over a serial peripheral interface (SPI) bus.

Specifically, the device connector 23 has a "D+" terminal 231 and a "D−" terminal 232, and the microcontroller 21 has an "SDA" terminal 211 and an "SCL" terminal 212 that are electrically connected to the "D+" terminal 231 and the "D−" terminal 232 of the device connector 23, respectively.

The EC 11 has an "SDA" terminal 111, an "SCL" terminal, and a "CS1" terminal through which a switch-control signal (CS1) is to be outputted by the EC 11. The peripheral controller 12 has a "D+" terminal 121, a "D−" terminal 122, a power terminal 123 and a ground terminal 124. The host connector 13 has a "D+" terminal 131, a "D−" terminal 132, a power terminal 133 that is electrically connected to the power terminal 123 of the peripheral controller 12, and a ground terminal 134 that is electrically connected to the ground terminal 124 of the peripheral controller 12.

The switch unit 14 has a first terminal 141 that is electrically connected to the "D+" terminal 121 of the peripheral controller 12, a second terminal 142 that is electrically connected to the "SDA" terminal 111 of the EC 11, a third terminal 143 that is electrically connected to the "D+" terminal 131 of the host connector 13, a switch-control terminal 144 that is electrically connected to the "CS1" terminal of the EC 11 for receiving the switch-control signal (CS1) therefrom, a fourth terminal 151 that is electrically connected to the "D−" terminal 122 of the peripheral controller 12, a fifth terminal 152 that is electrically connected to the "SCL" terminal 112 of the EC 11, and a sixth terminal 153 that is electrically connected to the "D−" terminal 132 of the host connector 13.

Figure 2:
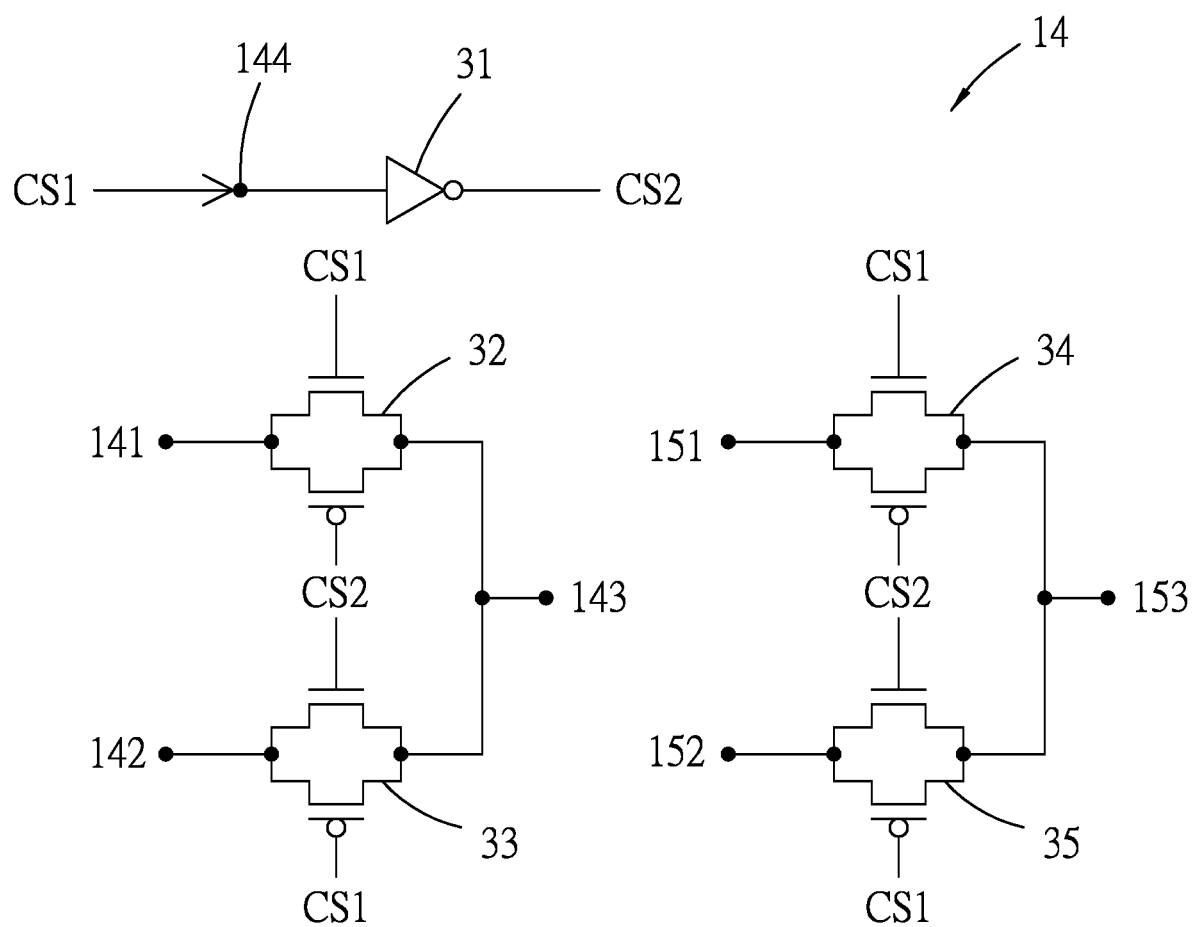
FIG. 2 is a circuit diagram illustrating an embodiment of a switch unit of the system according to the disclosure.

Referring to FIG. 2, a circuit diagram of the switch unit 14 is illustrated. The switch unit 14 includes an inverter 31 and four switches 32, 33, 34 and 35. Each of the four switches 32, 33, 34 and 35 is configured to operate in one of a conducting state and a non-conducting state. In this embodiment, each of the four switches 32, 33, 34 and 35 is implemented by a transmission gate, but is not limited thereto. For example, each of the four switches 32, 33, 34 may be implemented by an n-type transistor (e.g., an n-channel metal-oxide-semiconductor field-effect transistor, NMOSFET, or an NPN-type bipolar junction transistor, NPN BJT), a p-type transistor (e.g., a p-channel MOSFET, PMOSFET, or a PNP-type BJT, PNP BJT), or any electronic component that can be used to implement the functions of a switch.

The inverter 31 is configured to receive the switch-control signal (CS1), and perform a logical negation on the switch-control signal (CS1) to generate an inverted switch-control signal (CS2). Each of the four switches 32, 33, 34 and 35 would receive both the switch-control signal (CS1) and the inverted switch-control signal (CS2). When the switch-control signal (CS1) is at a logical high level (e.g., 5 V) which corresponds to logic one, the inverted switch-control signal (CS2) will be at a logical low level (e.g., 0 V) which corresponds to logic zero, and the switch 32 operates in the conducting state for electrically connecting the first terminal 141 and the third terminal 143, the switch 33 operates in the non-conducting state for disconnecting the second terminal 142 and the third terminal 143, the switch 34 operates in the conducting state for electrically connecting the fourth terminal 151 and the sixth terminal 153, and the switch 35 operates in the non-conducting state for disconnecting the fifth terminal 152 and the sixth terminal 153. When the switch-control signal (CS1) is at the logical low level, the inverted switch-control signal (CS2) will be at the logical high level, so/and the switch 32 operates in the non-conducting state for disconnecting the first terminal 141 and the third terminal 143, the switch 33 operates in the conducting state for electrically connecting the second terminal 142 and the third terminal 143, the switch 34 operates in the non-conducting state for disconnecting the fourth terminal 151 and the sixth terminal 153, and the switch 35 operates in the conducting state for electrically connecting the fifth terminal 152 and the sixth terminal 153.

The memory device 16 is configured to store firmware to be executed by the EC 11. In this embodiment, the memory device 16 may be implemented by a programmable read-only memory (PROM), a flash memory, an electrically-erasable programmable read-only memory (EEPROM) or any other non-volatile memory device, but is not limited thereto. It is worth to note that the memory device 16 and the EC 11 may be mounted on the same printed circuit board.

The EC 11 may be implemented by a CPU, a microprocessor, a micro control unit (MCU), a system on a chip (SoC), or any circuit configurable/programmable in a software manner and/or hardware manner to implement the functionalities discussed in this disclosure. The EC 11 is configured to carry out power control, thermal management and data communication among various components of the computer 1. For example, the EC 11 forces the computer 1 to shut down when it is determined that a power button of the computer 1 has been pushed for a predetermined time duration (e.g., five seconds), reads a temperature value related to the processor of the computer 1 from a thermometer of the computer 1 so as to control rotating speed of a fan of the computer 1, detects signals outputted by a PS/2 keyboard of the computer 1, and performs power management of the computer 1 according to "S3" and "S4" states defined in advanced configuration and power interface (ACPI) Specification.

When the power supply of the computer 1 receives mains electric power, the EC 11 is capable of obtaining from the power supply electricity and operating from the power supply, even when the computer 1 has not been powered on. When the EC 11 is supplied with electricity, the EC 11 reads firmware stored in the memory device 16, and executes the firmware thus read to perform a control procedure. In particular, the EC 11 executing the firmware controls the power supply to supply required voltages (e.g., 3.3 V and 5 V) to various components (e.g., the processor, the PCH and the volatile memory) of the computer 1. Further, when the device connector 23 of the management device 2 is electrically connected to the host connector 13 of the computer 1, the EC 11 executing the firmware controls the switch unit 14 to operate in the OOB state to establish an electrical connection between the EC 11 and the host connector 13, i.e., electrically connect the second terminal 142 and the third terminal 143 of the switch unit 14 and electrically connect the fifth terminal 152 and the sixth terminal 153 of the switch unit 14, so as to allow the EC 11 to communicate with the microcontroller 21 through the device connector 23 and the host connector 13 to receive the external data from the microcontroller 21. It is worth to note that a signal path linking the "SDA" terminal 211 of the microcontroller 21, the "D+" terminal 231 of the device connector 23, the "D+" terminal 131 of the host connector 13, the second terminal 142 and the third terminal 143 of the switch unit 14, and the "SDA" terminal 111 of the EC 11 belongs to the SDA line of the I²C bus; a signal path linking the "SCL" terminal 212 of the microcontroller 21, the "D−" terminal 232 of the device connector 23, the "D−" terminal 132 of the host connector 13, the fifth terminal 152 and the sixth terminal 153 of the switch unit 14, and the "SCL" terminal of the EC 11 belongs to the SCL line of the I²C bus.

Each of the EC 11 and the microcontroller 21 is switchable between a master mode and a slave mode. That is to say, during communicating with each other by using the USB protocol under the master-slave architecture, when one of the EC 11 and the microcontroller 21 is in the master mode, the one of the EC 11 and the microcontroller 21 has the master control and is capable of taking initiative to transmit data the other one of the EC 11 and the microcontroller 21 that is in the slave mode.

The microcontroller 21 is configured to initially operate in the slave mode. In the slave mode, the microcontroller 21 is configured to adjust voltage levels respectively on the SDA line and the SCL line of the I²C bus in a manner that the voltage levels on the SDA line and the SCL line satisfy a predefined condition. In the master mode, the microcontroller 21 is configured to transmit the external data to the EC 11 based on protocols defined in I²C specification, and after transmission of the external data is completed, notify the EC 11 of the completion of the transmission. In this embodiment, the notification of the completion of the transmission is implemented by the microcontroller 21 transmitting to the EC 11 a flag value that is stored in register(s) of the microcontroller 21.

It should be noted that the predefined condition is that the voltage levels of the SDA line and the SCL line are both at the logical low level (i.e., 0 V). Specifically, the microcontroller 21 is configured to, in the slave mode, adjust the voltage levels on the SDA line and the SCL line to satisfy the predefined condition for a preset mode-switching time period ranging from 5 to 10 milliseconds. In this embodiment, the preset mode-switching time period is 10 milliseconds.

The EC 11 is configured to initially operate in the master mode. In the master mode, the EC 11 is configured to determine whether the voltage levels on the SDA line and the SCL line of the I²C bus have satisfied the predefined condition for the preset mode-switching time period. When it is determine that the voltage levels on the SDA line and the SCL line have satisfied the predefined condition for the preset mode-switching time period, the EC 11 is configured to enable the microcontroller 21 to switch to the master mode by adjusting the voltage levels on the SDA line and the SCL line to satisfy the predefined condition for the preset mode-switching time period, and switch to the slave mode. Accordingly, when the microcontroller 21 detects that the voltage levels on the SDA line and the SCL line satisfy the predefined condition for the preset mode-switching time period, the microcontroller switches to the master mode. In some embodiments, the EC 11 may further determines whether the computer 1 malfunctions or needs the external data, and switches to the slave mode and enables the microcontroller 21 to switch to the master mode when the determination is affirmative. In response to receipt of the notification of the completion of the transmission, the EC 11 is configured to switch to the master mode and adjust the voltage levels on the SDA and the SCL of the I²C bus in a manner that the voltage levels on the SDA and the SCL satisfy the predefined condition for the preset mode-switching time period so as to enable the microcontroller 21 to switch to the slave mode.

While receiving the external data, the EC 11 is configured to store the external data in the memory device 16, and based on the external data thus stored, to update firmware (e.g., BIOS) of the computer 1, to update firmware of the EC 11, or to recover an operating system of the computer 1. In this way, the system according to the disclosure can restore the functions of the computer 1 when the computer 1 malfunctions, even when the computer 1 cannot normally boot.

The EC 11 is further configured to, when the EC 11 is in the master mode, determine whether the voltage levels on the SDA and the SCL of the I²C bus satisfy the predefined condition all the time in a preset state-switching time period ranging from 5 to 10 milliseconds. In this embodiment, the preset state-switching time period is 10 milliseconds. When it is determined that the voltage levels on the SDA and the SCL of the I²C bus do not satisfy the predefined condition all the time in the preset state-switching time period, the EC 11 is configured to switch the switch unit 14 to the USE state, i.e., to electrically connect the first terminal 141 and the fourth terminal 143 of the switch unit 14 and to electrically connect the fourth terminal 151 and the sixth terminal 153 of the switch unit 14, so as to allow the peripheral controller 12 to communicate with an external USB device (e.g., a flash drive) via the host connector 13. In this embodiment, the peripheral controller 12 communicates with an external USB device based on protocols defined in USB standards.

It should be noted that in this embodiment, the EC 11 reads firmware stored in the memory device 16 for performing the control procedure, in which the EC 11 switches the switch unit 14 to one of the OOB state and the USB state, only at the beginning of supplying the EC 11 with electricity. Therefore, in a scenario that the management device 2 is disconnected from the computer 1 after that the EC 11 has switched the switch unit 14 to the COB state, and then the management device 2 is reconnected to the computer 1 or an external USE device is connected to the computer 1, the supplying of electricity to the EC 11 has to be restarted so as to enable the EC 11 to read firmware stored in the memory device 16 again for performing the control procedure.

Figure 3:
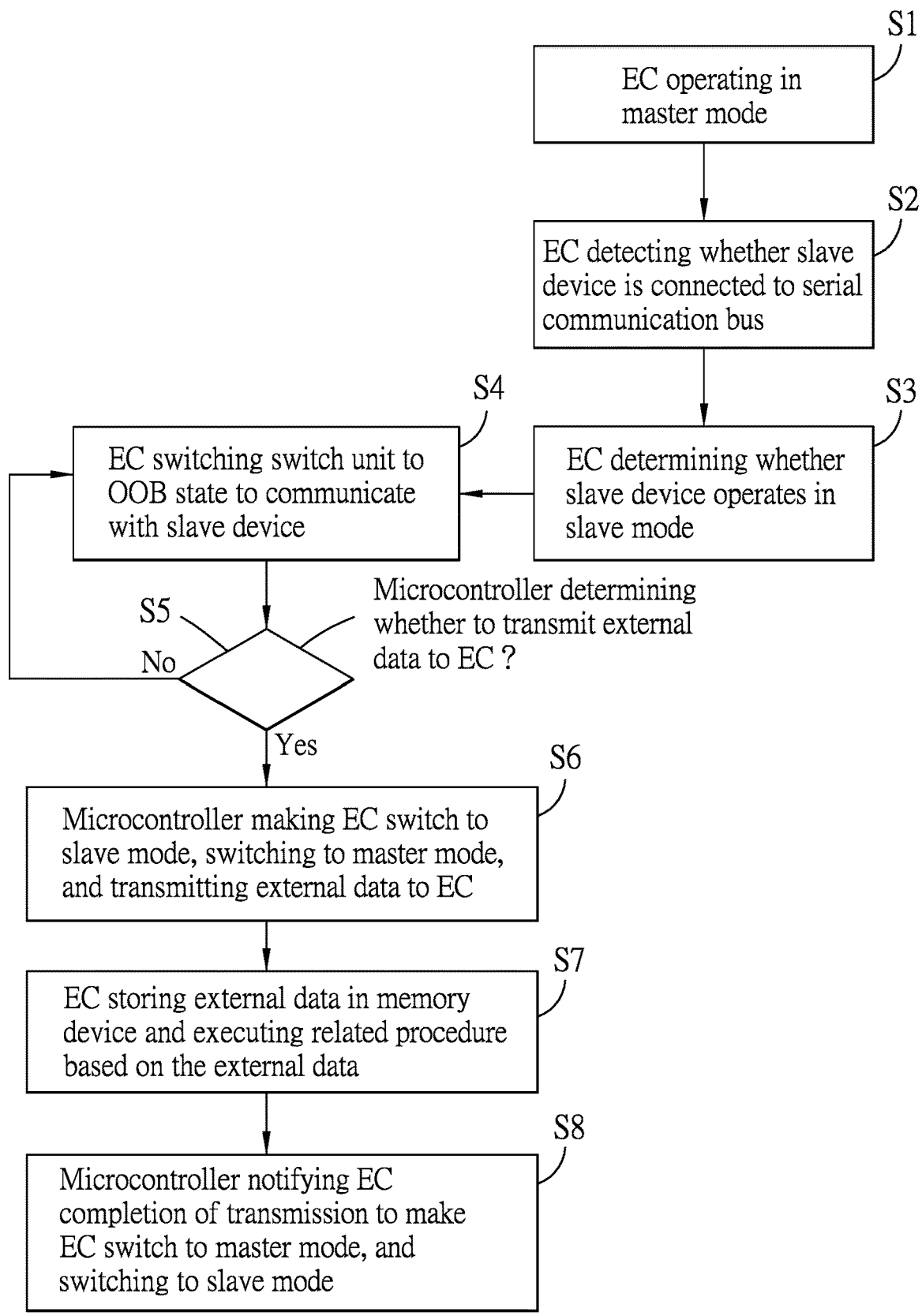
FIG. 3 is a flow chart illustrating an embodiment of a method for controlling a computer to receive external data for OOB management according to the disclosure.

Referring to FIG. 3, an embodiment of a method for controlling the computer 1 to receive external data for COB management is illustrated. The method is to be implemented by the system that is previously described. The method includes steps S1 to S8 delineated below.

In step S1, the EC 11 operates in the master mode.

In step S2, the EC 11 performs a signal detection through a serial communication bus that uses a master-slave architecture to detect whether a slave device that supports a predefined protocol is connected to the serial communication bus. When it is detected that a slave device that supports the predefined protocol is connected to the serial communication bus, a procedure flow of the method proceeds to step S3. For example, the slave device is the management device 2 that was previously described, the predefined protocol is a protocol defined in I²C specification, and the serial communication bus is an I²C bus. When it is detected that no slave device is connected to the serial communication bus, the EC 11 switches the switch unit 14 to the USE state.

In step S3, the EC 11 determines whether the slave device operates in the slave mode based on a determination as to whether the EC 11 receives, over the serial communication bus (i.e., the I²C bus), any signal that is related to the predefined protocol (i.e., the protocol defined in I²C specification) in the preset state-switching time period (e.g., 10 milliseconds). In this embodiment, the signal that is related to the predefined protocol is implemented by maintaining voltage levels of the SDA and the SCL both at the logical low level (i.e., 0 V) for the preset mode-switching time period (e.g., 10 milliseconds).

When it is determined that the EC 11 receives no signal that is related to the predefined protocol over the serial communication bus in the preset state-switching time period, the EC 11 determines that the slave device does not operate in the slave mode and switches the switch unit 14 to the USE state for allowing the peripheral controller 12 to communicate with the slave device.

On the other hand, when it is determined that the EC 11 receives the signal that is related to the predefined protocol over the serial communication bus in the preset state-switching time period, the EC 11 determines that the slave device operates in the slave mode, and the procedure flow proceeds to step S4.

In step S4, the EC 11 switches the switch unit 14 to the COB state and communicates with the slave device.

It is worth to note that when the management device 2 is connected to the computer 1, the microcontroller 21 would initially operate in the slave mode, and establish communication with the EC 11. In particular, the microcontroller 21 would adjust the voltage levels respectively on the SDA line and the SCL line of the serial communication bus in response to receipt of the detection signal in a manner that the voltage levels on the SDA line and the SCL line satisfy the predefined condition, i.e., the voltage levels of the SDA line and the SCL line are both maintained at the logical low level (i.e., 0 V), for the preset mode-switching time period. In this way, the EC 11 is capable of acknowledging that a slave device that supports a predefined protocol is connected to the serial communication bus.

In step S5, the microcontroller 21 determines, based on programs executed by the microcontroller 21 or external commands (which may be sent by the remote device 9) received by the microcontroller 21, whether to transmit the external data to the EC 11. When the microcontroller 21 determines to transmit the external data to the EC 11, the procedure flow proceeds to step S6.

In step S6, the microcontroller 21 adjusts voltage levels respectively on the SDA line and the SCL line of the serial communication bus in a manner that the voltage levels on the SDA line and the SCL line satisfy the predefined condition for the preset mode-switching time period.

When it is determined that the voltage levels on the SDA line and the SCL line of the serial communication bus have satisfied the predefined condition for the preset mode-switching time period, the EC 11 determines whether the computer 1 malfunctions or needs the external data. When it is determined that the computer 1 malfunctions or needs the external data, the EC 11 enables the microcontroller 21 to switch to the master mode by adjusting the voltage levels on the SDA line and the SCL line to satisfy the predefined condition for the preset mode-switching time period, and switches to the slave mode. Subsequently, the microcontroller 21 operates in the master mode, and transmits the external data via the serial communication bus to the EC 11.

In step S7, while receiving the external data, the EC 11 stores the external data in the memory device 16 and executes a related procedure based on the external data. For example, the EC 11 may update firmware of the computer 1 based on the external data, or recover an operating system of the computer 1 based on the external data.

When transmission of the external data is completed, in step S8, the microcontroller 21 notifies the EC 11 of the completion of the transmission by transmitting the flag value to the EC 11.

In response to receipt of the notification of the completion of the transmission, the EC 11 switches to the master mode and adjusts the voltage levels on the SDA line and the SCL line of the serial communication bus in a manner that the voltage levels on the SDA line and the SCL line both satisfy the predefined condition for the preset mode-switching time period so as to enable the microcontroller 21 to switch back to the slave mode.

To sum up, with regard to the system and the method for controlling the computer 1 to receive external data for COB management according to the disclosure, the EC 11 and the switch unit 14 are disposed in the computer 1, and the management device 2 and the computer 1 are electrically connected to each other respectively via the device connector 23 of the management device 2 and the host connector 13 of the computer 1. When the EC 11 is supplied with electricity, the EC 11 controls the switch unit 14 to establish an electrical connection between the EC 11 and the host connector 13 so as to allow the EC 11 to communicate with the microcontroller 21 of the management device 2 through the EC 11 and the host connector 13 to receive the external data from the microcontroller 21. Based on the external data thus received, even when the computer 1 cannot normally boot due to inappropriate settings of the BIOS of the computer 1, the EC 11 can update firmware of the computer 1 or recover an operating system of the computer 1. That is to say, COB management is implemented on the computer 1.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for controlling a computer to receive external data for out-of-band (COB) management, the computer including a host connector, said system comprising:
    a switch unit configured to be electrically connected to the host connector;
    an embedded controller (EC) electrically connected to said switch unit; and
    a management device including a device connector that is configured to be electrically connected to the host connector, and a microcontroller that is electrically connected to said device connector and that is configured to send external data via said device connector to said EC,
    wherein, when said EC is supplied with electricity, said EC controls said switch unit to establish an electrical connection between said EC and the host connector so as to allow said EC to communicate with said microcontroller through said device connector and the host connector to receive the external data from said microcontroller.

2. The system as claimed in claim 1, further comprising a memory device,
    wherein said EC is further electrically connected to said memory device, and is configured to store the external data in said memory device and to update firmware of the computer based on the external data thus stored.

3. The system as claimed in claim 1, wherein said management device further includes a network controller that is electrically connected to said microcontroller, and that is configured to allow said microcontroller to communicate with a remote device for receiving the external data from the remote device.

4. The system as claimed in claim 1, the computer further including a peripheral controller, the peripheral controller and the host connector supporting universal serial bus (USB) standards,
    wherein said device connector supports USB standards, and said EC is configured to switch said switch unit between a USB state allowing the peripheral controller to communicate with an external USB device via the host connector, and an OOB state allowing said EC to communicate with said management device.

5. The system as claimed in claim 1, wherein said EC and said microcontroller are configured to communicate with each other using a universal serial bus (USB) protocol under a master-slave architecture.

6. The system as claimed in claim 5, wherein:
    said EC and said microcontroller are configured to communicate with each other over an inter-integrated circuit ($I^2C$) bus including a serial data line (SDA) and a serial clock line (SCL);
    each of said EC and said microcontroller is switchable between a master mode and a slave mode;
    said microcontroller is configured to initially operate in the slave mode, and to
        in the slave mode, adjust voltage levels respectively on the SDA and the SCL of the $I^2C$ bus in a manner that the voltage levels on the SDA line and the SCL line satisfy a predefined condition, and
        in the master mode, transmit the external data to said EC, and after transmission of the external data is completed, notify said EC of the completion of the transmission; and
    said EC is configured to initially operate in the master mode, and to
        in the master mode, determine whether the voltage levels on the SDA line and the SCL line of the $I^2C$ bus satisfy the predefined condition, and when it is determine that the voltage levels on the SDA line and the SCL line satisfy the predefined condition, determine whether the computer malfunctions or needs the external data, when it is determined that the computer malfunctions or needs the external data, enable said microcontroller to switch to the master mode by adjusting the voltage levels on the SDA line and the SCL line to satisfy the predefined condition for a preset mode-switching time period, and switch to the slave mode, and
        in response to receipt of the notification of the completion of the transmission, switch to the master mode and adjust the voltage levels on the SDA and the SCL of the $I^2C$ bus in a manner that the voltage levels on the SDA and the SCL satisfy the predefined condition so as to enable said microcontroller to switch to the slave mode.

7. The system as claimed in claim 6, wherein the predefined condition is that the voltage levels of the SDA and the SCL are both at a logical low level, and said microcontroller is configured to, in the slave mode, adjust the voltage levels on the SDA and the SCL to satisfy the predefined condition for the preset mode-switching time period,
  wherein said EC is configured, in the master mode, to determine whether the voltage levels on the SDA line and the SCL line of the I²C bus satisfy the predefined condition for the preset mode-switching time period.

8. The system as claimed in claim 6, the computer further including a peripheral controller, the peripheral controller and the host connector supporting universal serial bus (USB) standards, wherein said switch unit is configured to be electrically connected further to the peripheral controller, and
  wherein, in the master mode, said EC is further configured to, when it is determined that the voltage levels on the SDA and the SCL of the I²C bus do not satisfy the predefined condition all the time in a preset state-switching time period, switch said switch unit to a USB state allowing the peripheral controller to communicate with an external USB device via the host connector.

9. A method for controlling a computer to receive external data for out-of-band (OB) management, the computer including a host connector, the method to be implemented by a system that includes an embedded controller (EC), a memory device and a management device, the management device including a microcontroller, the method comprising steps of:
  the EC operating in a master mode to perform a signal detection through a serial communication bus that uses a master-slave architecture to detect whether a slave device that supports a predefined protocol is connected to the serial communication bus;
  the microcontroller operating in a slave mode, and establishing communication with the EC and adjusting voltage levels respectively on a serial data line (SDA) and a serial clock line (SCL) of the serial communication bus in response to receipt of the detection signal in a manner that the voltage levels on the SDA and the SCL satisfy a predefined condition;
  when it is determined that the voltage levels on the SDA line and the SCL line of the serial communication bus satisfy the predefined condition, the EC determining whether the computer malfunctions or needs the external data, when it is determined that the computer malfunctions or needs the external data, the EC enabling the microcontroller to switch to the master mode by adjusting the voltage levels on the SDA line and the SCL line to satisfy the predefined condition for a preset mode-switching time period, and switching to the slave mode;
  the microcontroller operating in the master mode to transmit external data via the serial communication bus to the EC;
  after transmission of the external data is completed, the microcontroller notifying the EC of the completion of the transmission;
  in response to receipt of the notification of the completion of the transmission, the EC switching to the master mode and adjusting the voltage levels on the SDA and the SCL of the serial communication bus in a manner that the voltage levels on the SDA and the SCL satisfy the predefined condition so as to enable the microcontroller to switch to the slave mode; and
  after receiving the external data, the EC storing the external data in the memory device and executing a related procedure based on the external data.

10. The method as claimed in claim 9, wherein executing a related procedure includes executing one of updating firmware of the computer based on the external data, and recovering an operating system of the computer based on the external data.

11. The method as claimed in claim 9, wherein the serial communication bus is an inter-integrated circuit (I²C) bus.

12. The method as claimed in claim 9, wherein the predefined condition is that the voltage levels of the SDA and the SCL are both at a logical low level, and the step of the EC switching to the slave mode and enabling the microcontroller to switch to the master is executed when it is determined that the voltage levels on the SDA line and the SCL line of the I²C bus satisfy the predefined condition for the preset mode-switching time period.

* * * * *